Oct. 18, 1938.     S. E. DONOHUE     2,133,740
COMBINED TABLE AND AQUARIUM
Filed Oct. 18, 1937
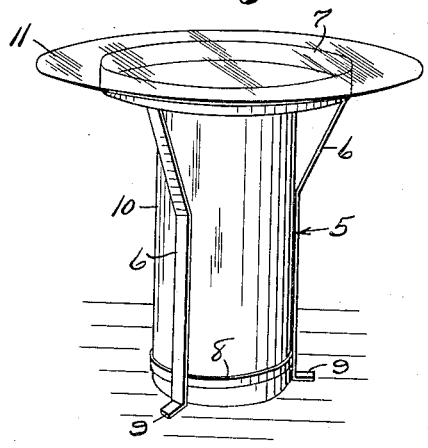
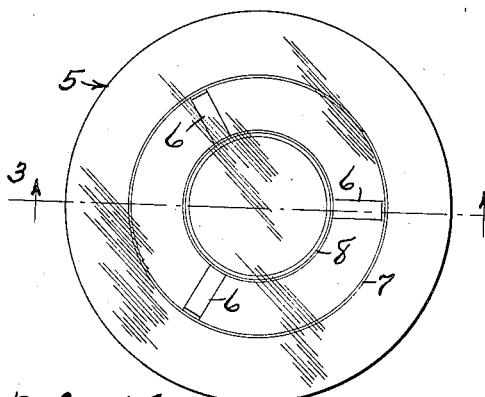
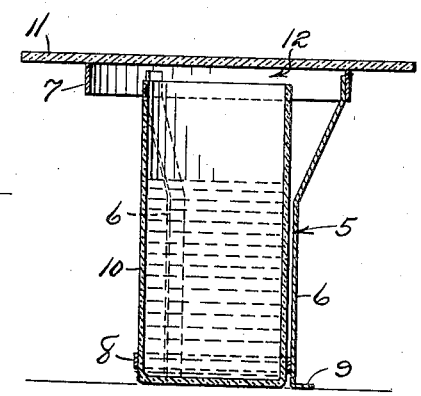
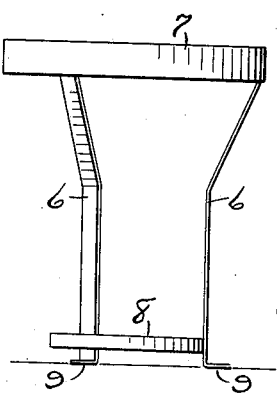
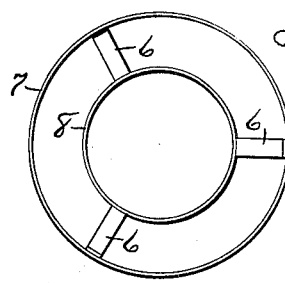
Stephen E. Donohue, INVENTOR
BY Victor J. Evans & Co.
ATTORNEYS Patented Oct. 18, 1938

2,133,740

UNITED STATES PATENT OFFICE 2,133,740

COMBINED TABLE AND AQUARIUM

Stephen E. Donohoue, Charleston, W. Va.

Application October 18, 1937, Serial No. 169,737

2 Claims. (Cl. 119—5)

My invention relates to a combined table and aquarium.

One of the principal objects of my invention is to provide a table equipped with an aquarium disposed in a manner whereby the aquarium serves to prevent accidental overturning of the table.

Another object of my invention is to provide a device of the above described character constructed of transparent means forming an upper guard for the aquarium and at the same time permitting a view of the contents thereof.

Other objects and advantages will be apparent from the following description, appended claims and annexed drawing.

Referring to the drawing wherein like reference characters designate like parts throughout the several views:

Fig. 1 is a perspective view of my invention.

Fig. 2 is a top plan view thereof.

Fig. 3 is a sectional view taken on the line 3—3 of Figure 2.

Fig. 4 is a side elevation of the table frame.

Fig. 5 is a top plan view of the table frame.

In practicing my invention I provide a table 5 comprising a frame having supporting legs 6 connected together at the upper and lower ends thereof by means of upper and lower circumferentially extending members 7 and 8 respectively. The lower ends of the legs 6 are offset to form feet 9 for engagement with a floor surface or the like and said upper and lower members are constructed of a substantially cylindrical configuration, said upper member being of a greater diameter than said lower member. The legs 6 intermediate of the upper and lower ends thereof are offset and inclined upwardly and outwardly for jointure with the upper member 7. Interposed between the legs 6 and extending between the upper and lower members is a reservoir 10 of an elongated cylindrical configuration and constructed of transparent material, preferably glass, to form an aquarium. Said aquarium or reservoir is provided with a suitable liquid, for instance water, in which species of aquatic animals such as gold fish are adapted to be contained. Mounted on the upper member 7, above the upper end of the reservoir 10, is a table top 11 preferably constructed of glass. The upper end of the reservoir 10 is spaced from the top to effect an air passage 12 whereby air, necessary for the aquatic animals contained in the reservoir, is permitted to be circulated therethrough.

From the foregoing it will be apparent that the top 11 effects a guard to protect the upper end of the reservoir and at the same time permits of a view of the contents of the reservoir. Furthermore, the weight of the liquid contained in the reservoir serves to prevent accidental overturning of the device. By means of the transparency of the top and the reservoir, a view of the contents of the reservoir may be had from any position.

What I claim is:

1. A device of the character described, comprising, in combination with a reservoir, a table comprising supporting legs, upper and lower members connecting said legs together and a transparent top mounted on said upper member, said reservoir extending between said legs and embraced by said members, said upper member coacting with said top to effect an air passage communicating with the top of said reservoir, said top effecting a guard above said reservoir in a manner to permit a view of the contents in said reservoir through the top thereof.

2. A device of the character described, comprising, a table having supporting legs, upper and lower members connecting said legs together at the tops and bottoms thereof respectively, and a transparent top mounted on said upper member, in combination with a reservoir extending between said legs and formed with an open top, the top of said reservoir being embraced by said upper member whereby said transparent top effects a guard over said open top of said reservoir in a manner to permit a view of the contents in said reservoir through the top of the latter, said lower member engaging said reservoir and coacting with the latter to maintain said table in upright position against accidental overturning.

STEPHEN E. DONOHOUE.